Oct. 10, 1933. L. N. LAUER Re. 18,966

CONTROLLING DEVICE FOR BRAKE CAMS

Original Filed Aug. 30, 1929

INVENTOR.
LÉON NICOLAS LAUER
BY C. H. Fowler
ATTORNEY

Reissued Oct. 10, 1933 Re. 18,966

UNITED STATES PATENT OFFICE 18,966

CONTROLLING DEVICE FOR BRAKE CAMS

Léon Nicolas Lauer, Clichy, Seine, France, assignor to Societe Anonyme des Etablissements Piganeau & Co., Sansjillon Clichy, Seine, France Original No. 1,792,432, dated February 10, 1931, Serial No. 389,528, August 30, 1929, and in France May 3, 1929. Application for reissue September 30, 1931. Serial No. 566,135

15 Claims. (Cl. 188—78)

In certain known types of braking devices, a floating actuating cam serving to expand the brake shoes is pivoted to an arm secured to an operating shaft. The direction of rotation of the shaft is such that the cam first acts upon the brake shoe predominantly active when the vehicle is proceeding forwardly. However, it may be that for constructional reasons it is necessary to rotate the operating shaft in the opposite direction.

An object of the invention is to provide a controlling device which, regardless of the reversal of direction of rotation of the operating shaft, permits of an action upon the brake shoes in the proper direction when the vehicle is proceeding forwardly. For this purpose, the arm to which the cam is pivoted is itself pivotally mounted upon a fixed pivot, this being actuated relatively to the operating shaft on the side opposite the axis of pivotation of the cam upon the arm, which latter is rotatable about the fixed axle under the action of a crank pin on the shaft and acts upon the arm at a point situated between the fixed axle and the axis of the controlling shaft.

Another object of the invention is to provide means for applying the friction elements or shoes of a brake, wherein the brake applying force may be directed in a reverse direction from that in which it is normally applied.

A further object of the invention is to provide a simple and effective means for operating the friction elements or shoes of a brake, including a lever actuated by an eccentric on the end of the operating shaft and having pivoted thereto a spreading member adapted to engage the respective ends of the shoes.

An additional object is the provision of a device of this character which will be simple and inexpensive in structure, highly efficient in use, positive in action, durable in service and a general improvement in the art.

Other objects of the invention will appear from the following description taken in connection with the drawing, which forms a part of this specification, and in which.

Figure 1:
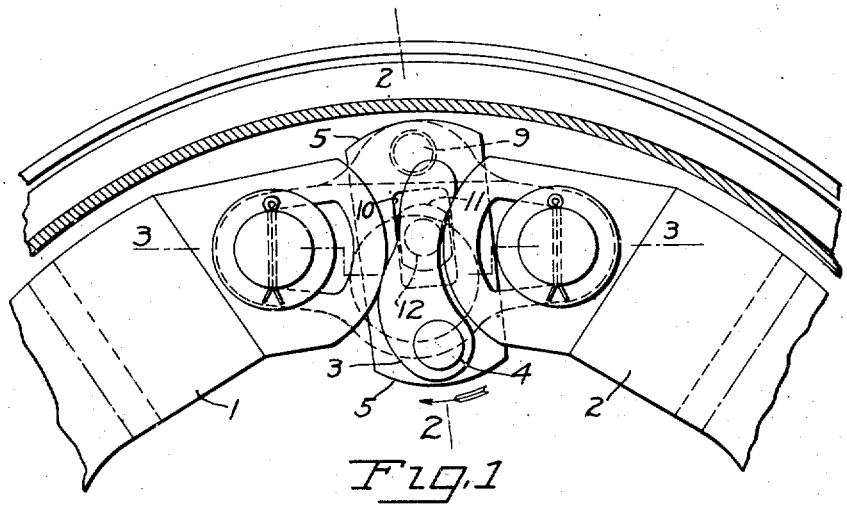
Figure 1 is an elevational view of a brake partly broken away illustrating the controlling device.
Figure 2:
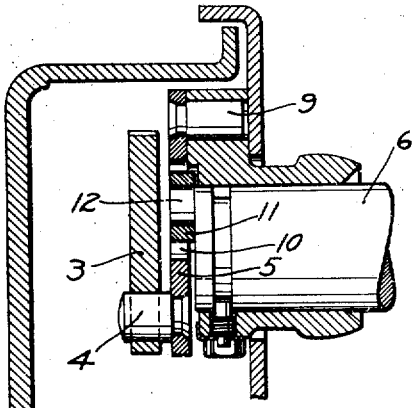
Figure 2 is a section substantially on the line 2—2 of Figure 1.
Figure 3:
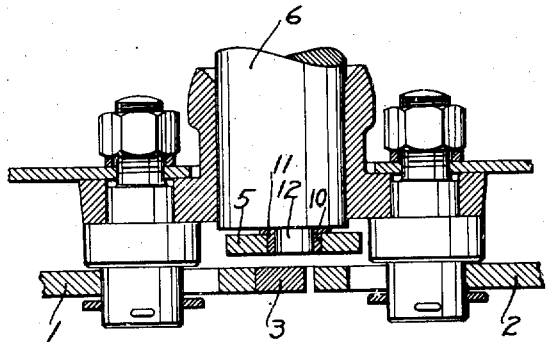
Figure 3 is a section substantially on the line 3—3 of Figure 1.

A primary expanding member or shoe 1 and a secondary expanding member or shoe 2 of a left hand front wheel, for instance, may be expanded by a cam 3 pivoted by a pin 4 to an arm 5, this arm being in the known devices directly secured to an operating shaft 6 which in this case is rotatable in the clockwise direction. For this direction of rotation of the shaft 6, the cam 3 first acts upon the shoe 1, which may be for instance a floating shoe. This shoe when in contact with the brake drum, which turns in the counter-clockwise direction when the vehicle is proceeding forwardly, acts upon another shoe pivoted to the said shoe 1, and pivotally mounted on a stationary anchor, whereby this second shoe will be placed in contact with the drum. Hence the action on the shoe 1 is the predominant factor, since its movement determines the motion of the second shoe when the vehicle is proceeding forward.

For constructional reasons, it may be necessary that the operating shaft 6 be turned only in the contrary direction to the usual proceedure when operating the brakes, that is, in the counter-clockwise direction. If the arm 5 were still directly secured to the shaft 6, the cam 3 would be moved towards the right (Fig. 1) and would first act upon the shoe 2 until the latter attains a stationary point, and it is only at this time that the cam 3 would act upon the shoe 1 by using the shoe 2 as a fulcrum. The operation of the device, when the vehicle is proceeding forwardly, would not be correct, since the shoe 1 would not be applied first to engage the drum in order to move with the drum and to push the second shoe 2 against the drum.

The device for controlling the cam according to the present invention has for its object to establish the normal action of the cam 3 when, in order to operate the brakes the shaft 6 is turned only in a counter-clockwise direction, that is, to control the cam in such a manner that in spite of the reversed rotation of the controlling shaft 6, the cam will act first upon the shoe 1.

For this purpose, the arm 5 is not directly secured to the shaft 6, but is pivoted to a stationary pin 9 disposed, with reference to the said shaft, on the other side from the pivot pin 4. The arm 5 has a guide slot 10 in which is positioned a sliding member 11 mounted on a crank pin 12 forming part of the operating shaft 6 and eccentric with reference to the axis of the shaft. The crank pin, when in the idle position, is situated between the axis of the controlling shaft 6 and the pivot axis 9.

As shown in Figure 1, when the operating shaft is turned in the counter-clockwise direction, the crank pin 12 will be moved to the left together with the sliding member 11 and the arm 5. Since the arm 5 is pivoting on the stationary pin 9, this moves the pin 4 and the cam 3 to the left, and this first moves the shoe 1, the action of which is to predominate when the vehicle is proceeding forwardly. This arrangement provides the desired braking action, notwithstanding the reversed rotation of the controlling shaft 6. The lever arm entering into the action of the several members controlling the cam 3 or the braking ratios are determined by the length of the arm 5 and by the distance separating the crank pin 12 from the axis of the shaft 6.

Figure 4:
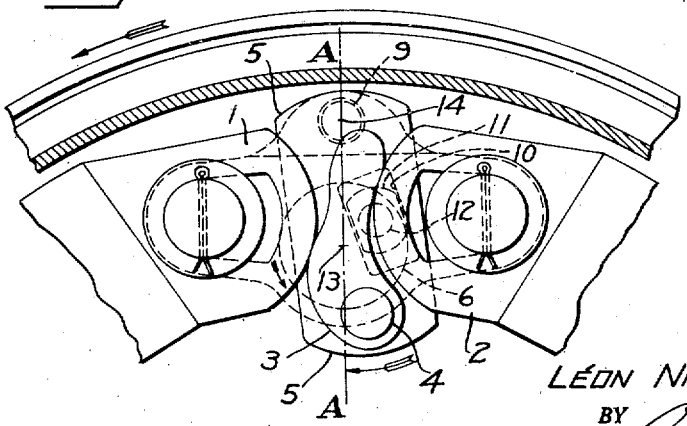
Figure 4 is a view of a modification.

Furthermore, by disposing for instance, when in the idle position, the crank pin 12 (Fig. 4) to the right of a plane A—A passing through the axis 13 of the shaft 6 and the axis 14 of the pivot pin 9, it is observed that the crank pin 12 and the sliding member 11 will be displaced, when the brakes are applied, in the slot 10 towards the pivot 9, thus increasing the length of the lever arm between the pivoting pin 4 and the crank pin 12. If the crank pin 12 is disposed to the left of the plane A—A, this lever arm will diminish during the braking action. Hence the position of the said crank pin with reference to this plane A—A will permit to obtain an increasing or diminishing effort during the braking action.

While the preferred embodiment of the invention has been described, it is to be understood that this is given merely as an example of the underlying principles and since this may be incorporated in other specific mechanical structures, I do not intend to be limited to those shown except as such limitations are clearly imposed by the appended claims.

Having thus described the various features of the invention, what I claim is new and desire to secure by Letters Patent is:

1. A brake comprising an operating shaft, a pin positioned eccentrically on the end of the shaft, a pivotal arm having a slot engaging the pin and a spreader pivotally connected to the arm.

2. A brake comprising an operating shaft, a pin positioned eccentrically on the end thereof, an arm pivoted for oscillation having a slot therein adapted to engage the pin and a spreader pivotally attached to the arm.

3. A brake comprising a rotatable shaft, means for preventing axial movement of the shaft, a pin positioned eccentrically on the end of the shaft, an arm pivoted for oscillation having a slot engaging the pin and a spreader pivoted on the free end of the arm.

4. A brake comprising a bracket, an operating shaft positioned for rotation in the bracket, means preventing axial movement of the shaft, an arm pivoted on the bracket having a slot adapted to engage the pin and a spreader pivotally secured to the free end of the arm.

5. A brake comprising a backing plate, shoes positioned for movement on the plate, a bracket secured to the plate, a shaft positioned for rotation in the bracket, means retaining the shaft against axial movement, a pin positioned eccentrically on the end of the shaft, a sleeve positioned for rotation on the pin, an arm pivoted on the bracket having a slot receiving the sleeve and a spreader positioned between the shoes pivoted on the free end of the arm.

6. A brake comprising a rotatable drum, a fixed support associated therewith, shoes positioned for movement on the support adaptable for co-operation with the drum, a bracket on the support, a shaft positioned for rotation in the bracket, means retaining the shaft against axial movement, a pin positioned eccentrically on the shaft, an arm pivoted to the bracket having a slot receiving the pin and a spreader pivoted on the free end of the arm engaging the shouldered ends of the respective shoes.

7. A brake comprising a rotatable drum, a support associated with the drum, primary and secondary shoes positioned for movement on the drum, a bracket secured to the support, a shaft positioned for rotation in the bracket, means retaining the shaft against axial displacement, a pin positioned eccentrically on the end of the shaft, a sleeve positioned for rotation on the pin having oppositely disposed flat sides, an arm pivoted on the bracket having a slot adapted to receive the sleeve, a pin in the free end of the arm and a spreader positioned between the shoulders of the shoes pivotally mounted on the pin.

8. A brake comprising a rotatable drum, a fixed support associated with the drum, shoes positioned for movement on the support and adaptable for co-operation with the drum, anchors for the shouldered ends of the shoes, a bracket secured to the support, an operating shaft positioned for rotation in the bracket, means retaining the shaft against axial movement, a pin positioned eccentrically on the end of the shaft, a sleeve positioned on the pin having oppositely disposed flat sides, a link pivoted on the bracket having a sliding connection with the sleeve, a pin in the free end of the link, and a spreader pivotally positioned on the pin adapted to engage the shoulders on the respective shoes.

9. A brake comprising a drum, braking elements adaptable for co-operation with the drum, means for expanding the braking elements including a rotatable shaft, a pivotal arm mounted on a fulcrum, a sliding connection between the arm and shaft some distance along the length of the arm from the fulcrum of the arm, and a spreader pivotally connected to the free end of the arm.

10. A brake comprising a rotatable drum, a fixed support, braking elements movable on the support and adaptable for co-operation with the drum, a shaft positioned for rotation on the support, an arm pivoted on the support and means connecting the shaft and arm to increase the movement of the arm in proportion to angular movement of the shaft and a spreader pivoted to the free end of the arm adaptable for co-operation with the braking elements.

11. In a braking device, two brake shoes with adjacent ends adapted to be moved towards and away from each other, a stationary axle, an arm pivotally mounted on said axle, a control shaft substantially at right angles with said arm, an expanding member between said adjacent ends of said shoes pivotally mounted on said arm on one side of the axis of said control shaft, and means for operatively connecting said shaft with said arm on the other side of the axis of said control shaft.

12. In a braking device, two brake shoes with adjacent ends adapted to be moved towards and away from each other, a stationary axle, an arm pivotally mounted on said axle, a control shaft substantially at right angles with said arm, an expanding member between said adjacent ends of said shoes pivotally mounted on said arm on one side of the axis of said control shaft, and means secured on said control shaft and slidingly connected with said arm on the other side of the axis of said control shaft.

13. In a braking device, two brake shoes with adjacent ends adapted to be moved towards and away from each other, a stationary axle, an arm pivotally mounted on said axle, a control shaft substantially at right angles with said arm, an expanding member between said adjacent ends of said shoes pivotally mounted on said arm on one side of the axis of said control shaft and a crank pin rigidly connected with said control shaft and slidingly connected with said arm on the other side of the axis of said control shaft.

14. In a braking device, two brake shoes with adjacent ends adapted to be moved towards and away from each other, a stationary axle, an arm pivotally mounted on said axle, a control shaft substantially at right angles with said arm and distant from said axle, an expanding member between said adjacent ends of said shoes pivotally mounted on said arm on the side opposite said axle with reference to said control shaft, and means for operatively connecting said shaft with said arm between said axle and the axis of said control shaft.

15. In a braking device, two brake shoes with adjacent ends adapted to be moved towards and away from each other, a stationary axle, an arm pivotally mounted on said axle, a control shaft substantially at right angles with said arm and distant from said axle, a stud on said arm on the side opposite said axle with reference to said control shaft, an expanding member between said adjacent ends of said shoes pivotally mounted on said stud, and means for operatively connecting said shaft with said arm between said axle and the axis of said control shaft, the connecting point with said arm being situated on one side of a line passing through said axle and said axis of said control shaft.

LÉON NICOLAS LAUER.